Sept. 5, 1967  J. T. ZELLERS, JR  3,340,031
SEAL FOR AND METHOD OF PACKING JOINTS IN A GLASS FURNACE
Original Filed March 31, 1959  4 Sheets-Sheet 1

INVENTOR
James T. Zellers, Jr.
BY
Nobbe & Swope
ATTORNEYS

INVENTOR
James T. Zellers, Jr.
BY Nobbe & Swope
ATTORNEYS

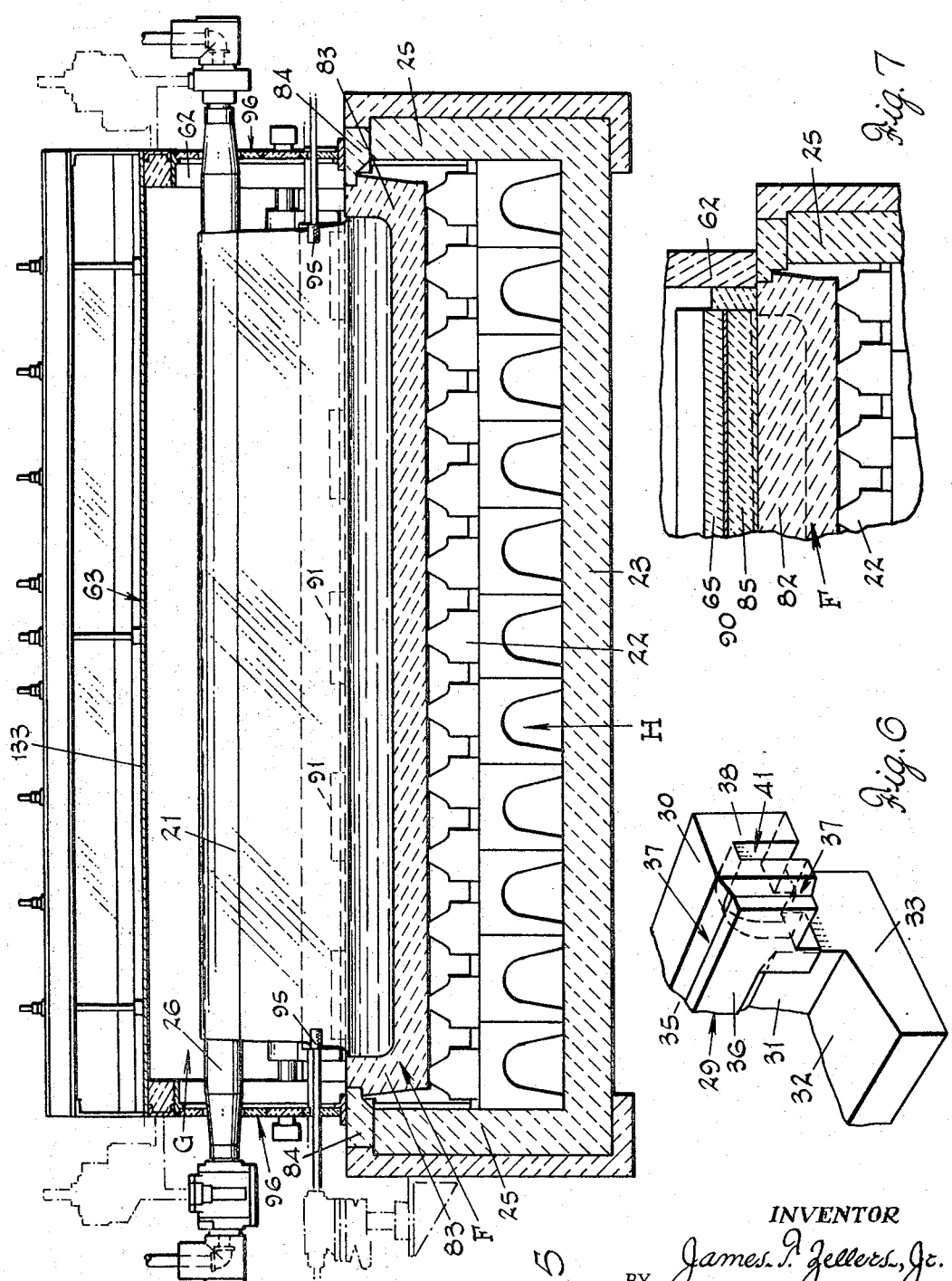

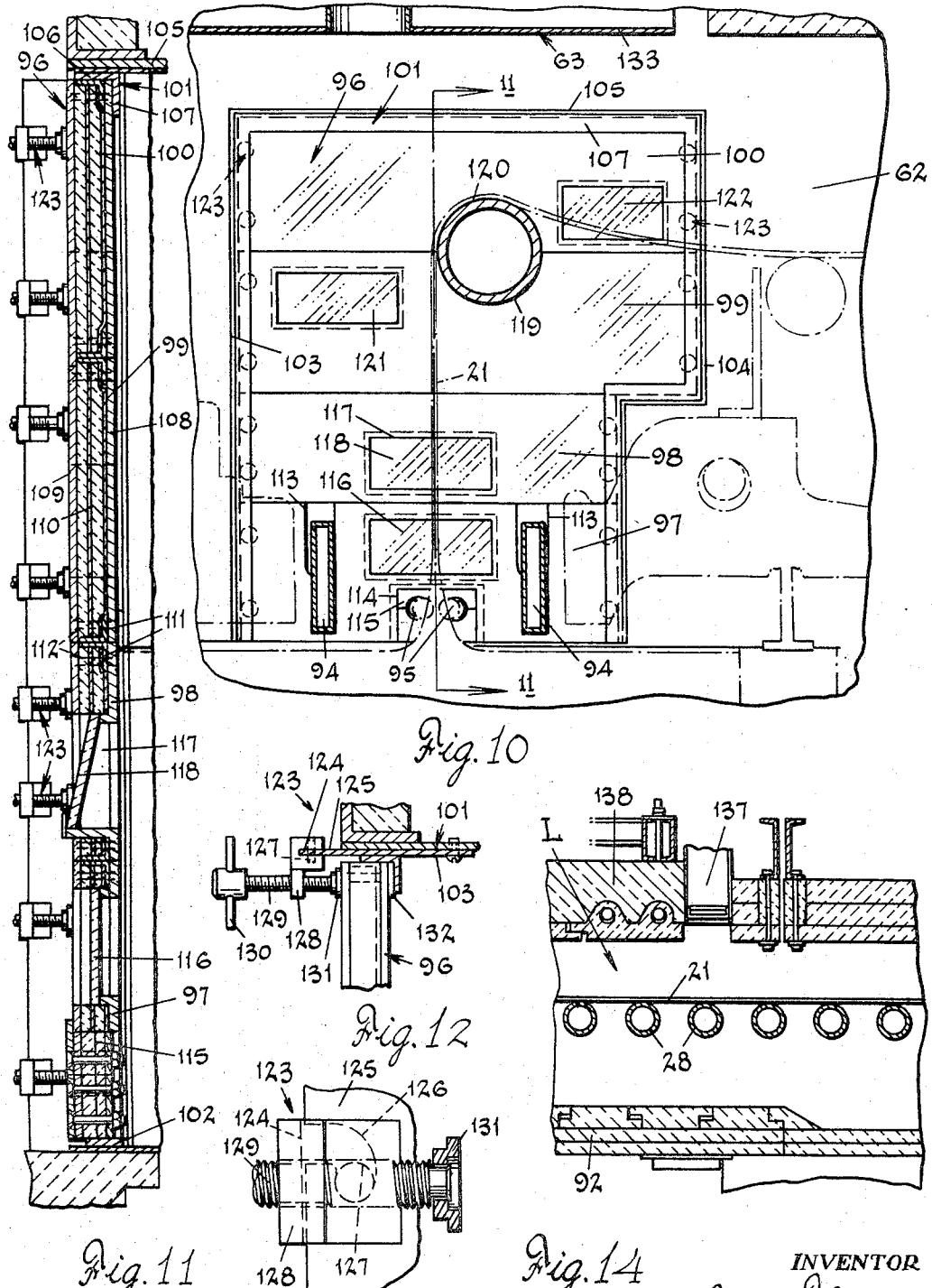

United States Patent Office 3,340,031
Patented Sept. 5, 1967

3,340,031
SEAL FOR AND METHOD OF PACKING
JOINTS IN A GLASS FURNACE
James T. Zellers, Jr., Charleston, W. Va., assignor to
Libbey-Owens-Ford Glass Company, Toledo, Ohio, a
corporation of Ohio
Original application Mar. 31, 1959, Ser. No. 803,220.
Divided and this application Nov. 25, 1964, Ser.
No. 415,854
5 Claims. (Cl. 65—27)

This is a division of application Ser. No. 803,220, filed Mar. 31, 1959 and now abandoned.

The present invention relates broadly to the production of sheet or window glass, and more particularly to improved method and apparatus for producing such glass with a minimum of distortion.

The term "sheet" or "window glass," as used herein, is intended to mean flat, drawn glass having fire-polished surfaces attained during the sheet formation, as distinguished from "plate glass," which is mechanically ground and polished, after being continuously formed as a ribbon.

As is well known, commercial sheet or window glass is produced by drawing a sheet or ribbon continuously from a pool of molten glass directly into final usable form, so that no subsequent surfacing treatment is required to impart smoothness and transparency. However, one of the disadvantages of flat, drawn sheet glass has been waviness or so-called "distortion" in the finished product. Such distortion is due to a lack of thickness uniformity or, differently expressed, to alternately thick and thin areas in the glass sheet. Different varieties of distortion are known in the art by various names which have been coined to designate specific types. Among these are "long wave distortion," "short wave distortion," "hammer," "batter," etc.

It is believed that these distortion defects in sheet glass are due to the presence of non-uniform and uncontrolled conditions within the window glass furnaces. More specifically, that they are due to a lack of sufficiently uniform temperature conditions from side to side of the stream or channel of molten glass flowing toward and into the zone of sheet formation, and also to the adverse influence of thermally induced air or convection currents that move toward, along and around the newly-formed sheet.

Moreover, it has been actually proven that the distortion difficulties that have heretofore been considered to be almost a characteristic of, as well as a necessary evil, in commercial window glass production can be overcome by proper control of atmospheric and temperature conditions within the furnace.

Therefore, it is the primary aim of this invention to substantially reduce, if not entirely eliminate, distortion defects in window glass and distortion problems in its production.

Another object of the invention is to accomplish the above purpose by the provision of a novel method and apparatus for controlling air movements within the sheet glass furnace.

Another object of the invention is to provide a glass furnace including means for isolating the various chambers of the glass from one another and from atmospheres exterior to the furnace.

Another object of the invention is the provision of means for controlling the temperatures of the molten glass across the width of the furnace.

Still another object of the invention is to generally improve temperature uniformity in window glass furnaces and to eliminate alternate hot and cold streaks, lines, spots and the like in the molten glass.

Other objects and advantages of the invention will become more apparent during the course of the following description, when taken in connection with the accompanying drawings.

In the drawings, wherein like numerals are employed to designate like parts throughout the same:

FIG. 5 is a transverse vertical sectional view through one machine of the furnace taken substantially along line 5—5 of FIG. 1;

FIG. 6 is a fragmentary perspective view of a sealing bar employed in the furnace;

FIG. 7 is a fragmentary cross-sectional view through one machine of the furnace taken on line 7—7 of FIG. 3;

FIG. 10 is a fragmentary elevational view of one side of the machine showing one end of the machine enclosure;

FIG. 11 is a transverse vertical sectional view of the enclosure panel taken on line 11—11 of FIG. 10;

FIG. 12 is a detail view of the mounting frame for the enclosure panels;

FIG. 13 is a fragmentary enlarged detail view of the mounting frame; and

FIG. 14 is a longitudinal sectional view of an extension of the machine shown in FIG. 3 and of the forward end of the annealing lehr connected thereto.

Figure 1:
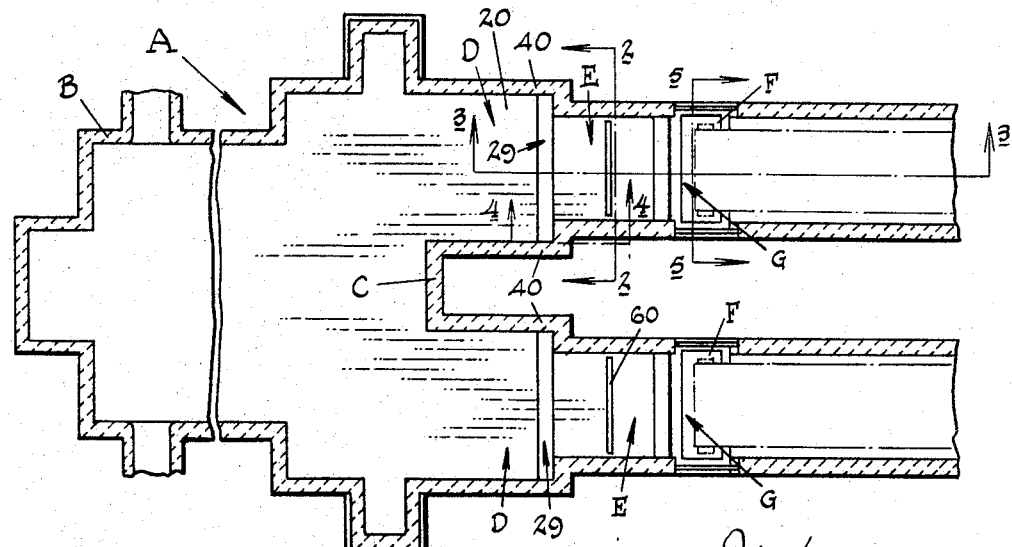
FIG. 1 is a fragmentary plan view of a window or sheet glass furnace provided with two window glass machines.
Figures 3, 8, 9:
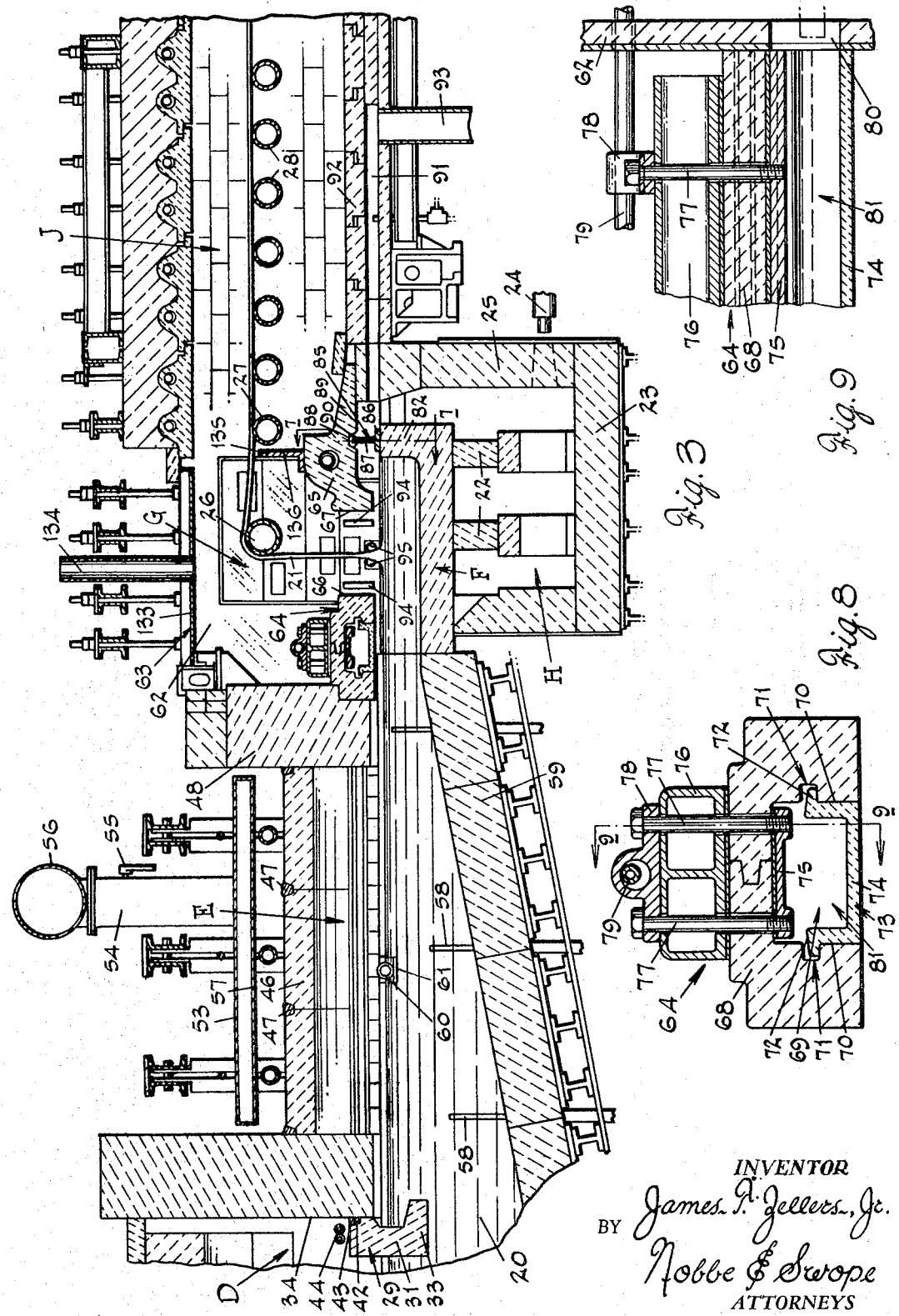
FIG. 3 is a longitudinal vertical sectional view taken on line 3—3 of FIG. 1.
FIG. 8 is an enlarged cross-sectional view of one of the lip-tiles.
FIG. 9 is a cross-sectional detail view of the lip-tile taken on line 9—9 of FIG. 8.

Referring now more particularly to the drawings, and with specific reference to FIG. 1, there is illustrated a continuous sheet glass furnace which is designated in its entirety by the letter A. It is conventional in furnaces of this character generally to include a gas-fired regenerative-type melting tank such as shown at B which supplies molten glass to one or more suitable refining or conditioning chambers; and, as here shown, there is provided a pair of such refining chambers, separated by a crotch wall C and such as have been illustrated at D. Although in no way restricted thereto, the present invention is particularly well adapted for use with a so-called Colburn type of sheet glass drawing machine and it will be described in that connection here. Thus, the forward end of each refining chamber D is joined by a cooling chamber E to a draw-pot F positioned below a drawing chamber G (FIGS. 1 and 3).

In a continuous tank-furnace such as just described, a mass of glass 20 is reduced to molten consistency in the melting tank B and flows from the melting end into and through the refining chambers D within which it is properly conditioned. From one or the other of the refining chambers, the molten glass moves through the associated cooling chamber E where it is gradually brought down toward working temperature, and finally it flows into the working receptacle or draw-pot F in the drawing chamber G from which a sheet or ribbon of glass 21 may be continuously drawn. The draw-pot F, in a conventional Colburn type window-glass machine, is supported upon stools 22 on the bottom 23 within the drawing or pot chamber H which is heated by gas flames from burners 24 introduced into and through the enclosure walls 25.

The sheet or ribbon of glass 21 is continuously drawn upwardly from the surface of the molten bath within the draw-pot and, while still in a semi-plastic condition, although substantially set in its final sheet form, is deflected into the horizontal plane about a bending roll 26 situated in the drawing chamber G and then passes over a so-called idler or intermediate roll 27 and through a flattening chamber J where the said ribbon 21 is supported and carried forwardly upon a series of horizontally aligned machine rolls 28. The ribbon advances from the drawing and flattening chambers G and J into a lehr L (FIG. 14) wherein it is supported and carried along upon the horizontally aligned rolls 28 until suitably annealed.

Now it has been customary, in most attempts to improve window glass distortion, to direct corrective efforts around and particularly in the zone of actual sheet formation. While this is believed to be of considerable importance, it has also been known that to achieve the best results, such corrective efforts preferably should be taken long before this.

Accordingly, it has been found that the manner of supplying batch materials to the furnace can be influential in setting up waves or currents in the molten glass which operate to disrupt the normally continuous flow of the molten glass into and through the refining chambers. Likewise, the periodic reversal of the firing and consequently the direction of pressure of the burning gases from one side of the furnace to the other sets up rapid fluctuations in temperature and pressure. This has been found to be especially true when the entrance from the refining chambers into the cooling chambers has been relatively open therebetween. Thus, the differentials of temperature and pressure forced back and forth in this vicinity have undoubtedly been instrumental in directing currents of air onto the surface of the glass and impinging the same, at irregular degrees of temperature and thereby producing so-called "cold streaks." Success in the reduction of this undesirable condition has been obtained by the introduction of submerged bars into the molten glass at this entrance point to close the open area above the glass against movement of the air between the refining and cooling chambers. However effective as such bars have been, because of their inherent size and slight imperfections in their surfaces the pressures set up in the melting area and refining chambers cause air currents from these chambers to gain entry into the cooling chambers over and around the surfaces of the bars.

Figure 4:
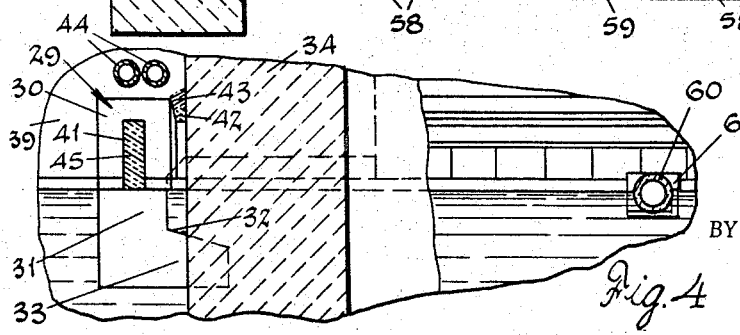
FIG. 4 is a fragmentary longitudinal vertical sectional view taken on line 4—4 of FIG. 1.

One important feature of the present invention is the provision of a remarkably effective seal for the entrance from the refining into the cooling chambers in the form of a special cut-off bar 29 partially above and partially below the molten glass at the entrance to the cooling chamber E. This bar which is here best seen in FIGS. 4 and 6 is of generally L-shape and has an enlarged portion 30 on the upper end of the vertical leg 31 and a preferably angled ledge 32 on the upper surface of the horizontal leg 33. As illustrated in FIG. 4, the enlarged portion 30 abuts the lower edge of the entrance arch or wall 34 and acts to provide both an air and a liquid seal between the cooling and refining chambers.

To improve the surface-to-surface relation between the upper, enlarged portion 30 of the bar 29 and the wall 34, the upper corner 35 of the vertically disposed surface 36 is provided with a rabbeted portion 37 extending horizontally thereacross and downwardly at the opposite ends 38 of the bar. These ends normally carry the bar 29 bodily on the upper surfaces of the breast walls 39 of the furnace and for this purpose project outwardly from the body portion of the vertical leg 31 which is intended to span the channel between the side walls 40 of the refining chamber. The bar ends 38, FIG. 6, are provided with inwardly directed, vertically disposed notches 41.

At the time the bar 29 is installed in the furnace and in close proximity to the wall 34, the rabbeted portion 37 forms a groove or open area which is then filled with a plugging or insulation material adapted to substantially close off or seal the open area and the surface-to-surface relation of the bar and the wall. A preferred manner of forming such a seal is to pack a rope-like material having high heat-resistance characteristics into the bottom of the groove or open area and then cover the same with a meltable glass composition, as indicated at 42 and 43 in FIG. 4. By way of example, the rope-like material can be an alumina silicate fiber with an organic carrier fiber incorporated therein. Another material that may be employed to equally good advantage for such purposes is a fibrous felt product consisting substantially of pure quartz fibers. The covering layer 43 of meltable glass can be formed by placing waste or cullet glass in strip form or otherwise on the insulation layer 42. The insulation material as well may be packed into the vertically disposed areas of the rabbeted portions 37 at the bar ends 38. The advantages gained by the use of such materials resides in the fact that as the cullet glass melts under the furnace heat, it combines with the insulation materials and softens to gradually fill the irregularities of the bar 29 and of the surface of the wall 34 thereby completely sealing the voids and otherwise open areas along the joinder of their surfaces.

Preferably, coolant pipes 44 are arranged above the bar 29 to create a slightly cooler atmosphere in the vicinity of the fill materials 42 and 43. This will by suitable control of the cooling medium in the pipes 44, operate to lower the temperatures in the vicinity of the melted glass material and thereby cause the same to become slightly hardened and provide an even more effective seal. The notches 41, in the ends 38 of the bar 29, likewise are preferably filled with a "plugging" material 45, such as clay or the like, which is forced downwardly therein. This operates to close the spaces between the ends of the leg portion 31 of the bar 29 and the adjacent surfaces of the walls 40 of the refining chamber thereby improving the extent to which a complete sealing or closure is produced along and between the surfaces of the furnace walls and the bar.

This manner of sealing makes it possible to substantially nullify the adverse effects of the pressure changes in the refining chamber that result from the flame reversal at the regenerators. It has been determined that this pressure change has heretofore been largely responsible of streaks of cross ream as a result of alternately following cold and hot streams of air and combustion gases from side to side of the furnace.

Because of its special shape, the bar 29 also sets up a backflow of hot glass along the ledge 32 and toward the side walls 39 or edges of the refining and cooling chambers near the glass surface which assists in establishing more uniform glass temperature conditions across the cooling chamber. Thus, the lower extremity of the leg 31 of the bar 29 produces a downward and then upward flow of molten glass as it enters the cooling chamber E which results in a continual surge of glass onto and laterally along the ledge 32 of the bar. As the lateral flow lessens, the glass again flows downwardly and in so doing causes a return flow of the cooled glass in the edge areas and in the vicinity of the side walls 39 of the chambers with the result that such glass becomes subject to a rearward current which operates to return the cooled glass into the refining chamber D and toward the higher temperature molten glass in the melting zone of the furnace.

Although generally referred to as a "cooling" chamber, the chamber E may be more aptly described as a heat extracting chamber since the temperature of the glass passing through the channel area thereof is gradually lowered by the controlled radiation or dissipation of heat and, it has been found that to effectively control sheet quality, it is important that this be done in such a manner as to establish and maintain a quiescent atmospheric condition above the glass surface in this area. According to the present invention this is accomplished first by the provision of a so-called radiant roof with means being provided to modify or balance the thermal conditions above the said roof and in opposition to the heat rising therefrom. Thus the roof arch 46 of the cooling chamber E may be formed of refractory materials known to have low reflective and high conductive characteristics. By way of example, one such material is silicon carbide. This, or equivalent materials, have been found to be well-adapted to promote absorption of the heat from the air above molten glass, and to then radiate the same outwardly in the outside atmosphere. Secondly, ingress of relatively cooler air from the outside must be prevented from moving inwardly along the abutting surfaces of the blocks, making up the roof or arch 46. To this end, these blocks may be individually rabbeted in their upper corners whereby a grooved area will be formed when the blocks are installed. These grooves receive an insulation material 47 of similar sealing characteristics to that employed in connection with the sealing of the cooling chamber at the bar 29. This manner of sealing the surface joints of the blocks unites the blocks into a more or less solid surface which is further sealed at its perimeter to the entry arch wall 34, the outlet arch wall 48 as well as to the blocks 49 forming the upper margins of the wall 50.

The roof arch 46 may be installed at any suitable predetermined elevation which will of course establish the amount of air space about the glass in which air turbulence must be prevented. It is herein proposed to mount the roof arch relatively low with reference to the surface of the molten glass which in itself operates to create an enclosed chamber of greatly restricted volume of area. This reduced area or air space beneath the arch and the fact that the blocks thereof are secured in sealed relation tends to prevent any turbulence of air currents and, by inducing a quiescent atmospheric condition, greatly assists in establishing an even or equalized cooling pattern from the center to the sides of the glass channel.

Lowering of the roof arch also enables the installation of lower side walls 50 which of course increases the effectiveness of the substantially sealed arch and the control of the atmosphere in the chamber formed thereby. Obviously as the height of the walls 50 is increased, more area is created that is susceptible to the entry of outside air currents which in part may be influenced by barometric pressures. These may vary throughout the day to set up an unbalance in pressure conditions between the outside temperatures and that in the cooling chamber.

Since it now becomes possible to gradually cool the glass flowing through the channel of the cooling chamber by substantially uniform radiation of heat from the roof arch 46, a more efficient control of the speed of its movement can be excercised to draw a smoother, more uniform and distortion-free sheet in the drawing chamber G. And it has been found that by increasing the rate of glass flow through the cooling chamber, the stagnation and chilling of the glass along the sides is considerably reduced.

Figure 2:
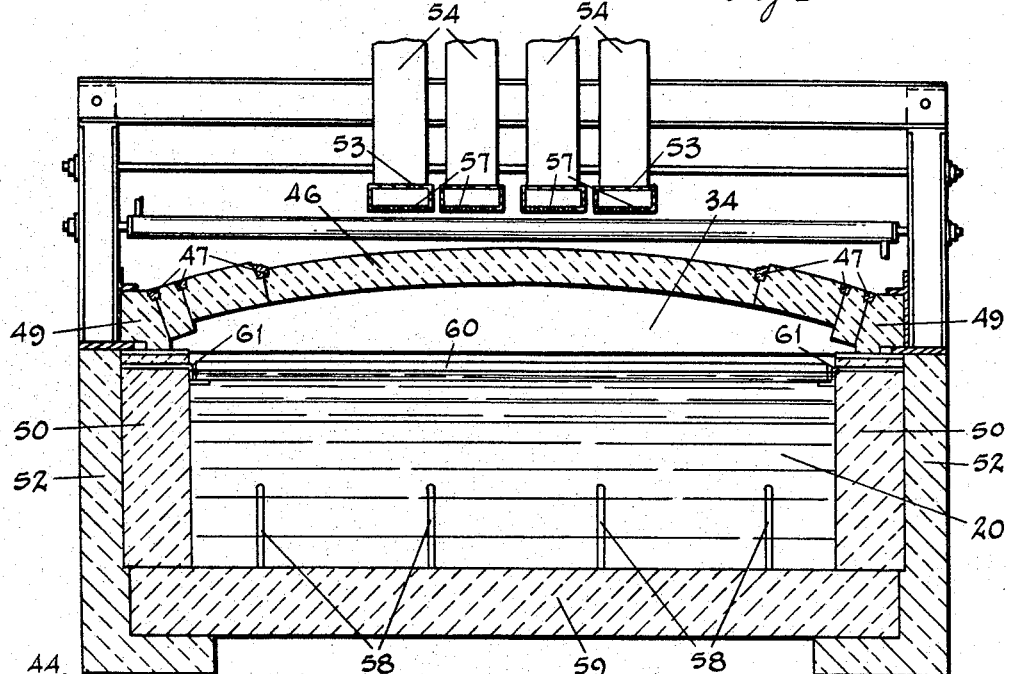
FIG. 2 is a transverse vertical sectional view through one of the cooling chambers of the furnace, taken substantially along the line 2—2 of FIG. 1.

Further, temperature uniformity can be achieved by insulation of the side walls 50, forming a part of the channel in which the glass moves, as is indicated at 52 in FIG. 2. The layers of insulation can be varied in height as well as thickness to produce a graduated manner of control along these areas.

In order to regulate the rate of heat loss from the outer surface of the arch 46, a plurality of air ducts 53 may be arranged in parallel with one another and the longitudinal axis of the cooling chamber. These ducts are provided with upwardly directed stacks 54, equipped with valves 55, which are connected in common to a supply manifold 56. The bottom wall 67 of each duct is provided with a plurality of small openings through which the air is directed downwardly toward the arch. This tends to create a cooling blanket of air into which the radiated heat from the arch of the cooling chamber rises. Consequently, by modifying the amounts of air from the ducts 53 and transversely across the width of the arch 46, the rate of heat loss can be controlled to the end that the side areas of the glass normally cooling and forming in and along the sides of the channel will actually be reacted upon the slower loss of heat from the side margins of the arch disposed thereabove. And this will permit a desired amount of balanced cooling to be carried out in the central area of the molten glass wherein a higher temperature is normally found.

Accordingly, by sealing the entry area and the arch of the cooling chamber, in addition to the insulation of the side walls thereof, a relatively stable condition of air can be maintained in the cooling chamber which greatly assists in reducing the formation of streaks of relatively cool glass even in areas of normally high temperature. Likewise, by controlling the rate of heat loss, a more balanced condition of cooling in the central surface area of the molten glass can be obtained which will result in a more equalized thermal condition between the said central surface area and the side areas thereof. The thermal conditioning of the glass in the cooling chamber can be indicated and so more accurately controlled by the use of thermocouples such as are indicated at 58 in FIGS. 2 and 3. These instruments may be arranged in suitably spaced relation in the longitudinal axis of the channel and laterally thereacross. And while being herein shown as installed in the bottom 59, it will be apparent that the thermocouples can be mounted in other areas of the chamber to equally good advantage.

The cumulative effect of the improved manner of sealing and constructing the glass furnace that have been thus far described is to deliver the molten glass to the draw-pot F properly conditioned, free of defects, and at a relatively high uniform temperature of a degree compatible with the thickness and speed at which the glass sheet or ribbon 21 is to be drawn.

In order to further reduce the formation of any lines or cordiness in the glass sheet, as herein shown, the conditioning of the molten glass in the cooling chamber is also controlled by providing a bar or "dam" in the immediate upper surface of the flowing glass. In this way, particles of eroded refractory material that are carried along in the glass stream are halted on one side of the bar and consequently do not find their way into the actual drawing area. For this purpose, a tube of quartz 60 having closed ends is located in the surface of the glass as shown in FIGS. 2, 3 and 4, and supported at its ends by brackets 61 supported on the side walls of the cooling chamber. It appears after successive tests, that the quartz tube does not collect the particles so as to gradually acquire an encrusted, dirty surface, but to the contrary merely impedes the progress of such particles until they become further reduced in the hot glass stream and are carried along as an intimate part thereof.

As best shown in FIGS. 3, 5 and 7, the drawing chamber G is separated from the cooling chamber E by the outlet arch wall 48, by oppositely disposed side walls 62 and by the roof 63. The bottom of the drawing chamber G is partially separated from the working receptacle F by a front lip-tile, generally designated by the numeral 64, and a rear lip-tile 65 which define, between their opposed surfaces 66 and 67, the actual zone of sheet formation as the glass is drawn upwardly from the working receptacle or draw-pot F and over the bending roll 26 in the drawing or forming chamber G.

In the operation of the so-called Colburn type machines, it has been a common practice to provide gas burners as sources of heat beneath the front lip-tile. These, however, in the main, have proven to be sources of dirt, due in part to the products of combustion and uncontrolled air currents which result in contamination of the air space above the molten glass and in the sheet drawing area. As illustrated here, an enclosed heating structure is substituted for the customary front lip-tile.

and has not only given all of the advantages of the open fire burners but also a noticeable improvement in absence of dust and dirt and diminution of air currents in the relatively thin and restricted pass beneath the lip-tile. The improved structure is embodied here in a muffle having a heat radiating surface directed downwardly toward the glass surface. By employing such a radiant surface across this area, it is possible to either introduce heat at desired areas and/or to create an atmosphere conducive to the withdrawal of heat.

Additionally, when the central area of the molten glass flowing beneath the lip-tile is running hotter than the edges, it may be found that the lower temperatures in the edges are more compatible to the speed of the drawing operation and the thickness of the sheet to be produced. In this case, cooling air can be directed toward the central area of the improved hollow or muffle lip-tile and will be radiated therethrough toward the central area of the molten glass to reduce the temperature therein.

Such a muffle-form of lip-tile 64 as shown in FIGS. 8 and 9, is formed of a basic elongated refractory block 68 having a downwardly directed U-shaped channel 69 formed therein. The oppositely disposed side walls 70 of the channel are provided with outwardly directed grooves 71 which serve to carry outwardly directed flanges 72 of a closure panel 73. The panel is substantially U-shaped in inverted relation to the form of the block 68 and the web 74 spans and closes the open mouth of the channel 69. This panel is made up of the same or a like material as the roof arch 46 and consequently is adapted to radiate heat therethrough. The lip-tile 64, as indicated in FIG. 9, is located at each of its ends in closely abutting relation to the inner surfaces of the side walls 62.

More particularly, a clamp plate 75 is located on the inner, upper surface of the channel 69 while a substantially tubular beam 76 is disposed in aligned relation on the upper surface of block 68. At spaced points between the ends of the beam, the block and the plate, aligned holes are provided to receive bolts 77 that are initially passed through mounting brackets 78 and then threaded at their ends into the plate 75. The muffle lip-tile 64 may thus be supported in the drawing chamber G by means of a bar 79 passed through the several brackets 78 and carried at its externally located ends by any suitable type of bracket or other supporting means.

It now becomes apparent that when heating burners are inserted through openings 80 provided in the side walls 62, the closed passageway 81 of the block 68 will conduct the heat therefrom onto the panel 73 which by reason of its radiant properties will transfer the heat to the air space above the glass and thus reduce any tendency to cooling or stagnation in the sides of the pool. Since each end of the lip-tile is in communication with the outside atmosphere through the openings 80, the products of combustion and any residual dirt or dust will be isolated from the atmosphere within the drawing chamber.

Opposite to the lip-tile 64 and in the area of the rear wall 82 of the draw-pot, the drawing chamber G is further sealed against the ingress of any waste gases resulting from the pot burners 24. By reference to FIGS. 3, 5 and 7, it will be seen that the hot combustion gases from such burners circulate throughout the area confined within the enclosure walls 25 and rise upwardly about the working receptacle or draw-pot F. Thus the side walls 83 of the pot are structurally connected substantially in sealing relation to the adjacent wall 25 by cap blocks 84 while the rear pot wall 82 is equipped with a partition 85. This partition is preferably made up of interlocking sections of a substantially inverted T-shape, with the web 86 of the T forming a base carried by the top surface of wall 82.

The vertically disposed leg 87 of the T-shaped partition is directed toward the undersurface of the rear lip-tile 65. In order to produce a tightly sealed relation therebetween, the present invention contemplates a groove 88, formed in the under surface 89 of the tile, filled with the sealing insulation maerial 90. Alternatively, the insulation material may be of a mat formation adapted to be laid upon the upper edge of the leg 87 and compressed thereupon when the lipe-tile 65 is installed in its functional position. This insulation may be an alumina silicate fiber with an organic carrying fiber incorporated therein, or like packing material that can be easily placed upon the vertically disposed leg 87 of the partition or packed into the groove 88.

The vertical leg or wall 87 of the partition 85 is also preferably made as thin as practicable, without lessening of its structural strength, to transmit radiantly as much heat as possible into the space beneath the lip-tile 65 at its forward end and onto the surface of the molten glass in the draw-pot. As viewed in FIG. 3, the upper area of the pot chamber as thus defined by the rear wall 82 of the draw-pot F, the partition 85 and the upper ends of the adjoining enclosure walls 25 is accordingly sealed from the area of the drawing chamber G and the waste gases from the burners 24 can be withdrawn through passageways 91 in the bottom wall or floor 92 of the flattening chamber and which are connected to a suitable duct 93 leading to a conventional exhaust or stack system (not shown).

Now as the glass is drawn upwardly as the continuous sheet or ribbon 21 from the draw-pot, its surfaces are normally adversely affected by the air currents in the forming chamber. The directions followed by such air currents have heretofore originated from several sources and the resultant turbulency of air in and around the sheet has had undesirable results upon sheet formation and has presented a continual problem. To illustrate, in employing the so-called Colburn method of drawing sheet glass, the provision of several coolers has seemed advisable to control the gradient of temperature in the rising sheet and as it approaches the bending roll 26. Thus, these types of furnaces or the drawing chamber thereof, have been customarily equipped with sheet coolers 94, positioned adjacent the facing surfaces 66 and 67 of the lip-tiles 64 and 65 respectively, and in the vicinity of the knurl rolls 95. Each of these devices, as in the case of the bending roll per se, has required mountings and/or connections to coolant sources which are located in or project through the opposite side walls 62 of the drawing chamber. In order to manipulate and adjust the several mountings, prior proposed machine enclosures have been built to contain such necessary mountings and connections. Consequently, the supporting means as for the bending roll 26, as shown in FIG. 5, has included the driving members as well as the outwardly leading pipes to the coolant source. By enclosing these several connections and mountings in areas in proximity to the glass sheet, there has been a constant source on each side of the furnace for colder air currents to originate in and along the enclosures and to move laterally inside toward the central area of the chamber. This is especially true on the so-called operator's side of the furnace since in order to make adjustments from time to time, the enclosure on this side is necessarily opened to gain access and the inrush of colder air accordingly has increased the cooling draft effect. In encountering the hotter air rising from the working receptacle, the currents of colder air, as indicated by the directional arrows in FIG. 5, mingle therewith but the temperature of the rising columns of air rising against the sheet surfaces is greatly reduced from that of a desired degree of working temperature.

The present invention provides a much more effective means for enclosing the drawing area of the machine to materially reduce the formation of circuitously moving air currents in the area of sheet formation. As illustrated in FIGS. 3, 5 and 10 to 13 inclusive, these improved machine enclosures, generally designated by the numeral 96, are substantially "flush" with the inner surfaces of the side walls 62 and consequently do not project outwardly into the relatively colder outside atmospheres. In being so positioned, the enclosures exclude the usual cooler and roll mountings and coolant connections. This importantly removes from within the confines of the drawing chamber the bodily colder mountings and connections, the dirt accumulating about the bending roll driving means and the many openings heretofore required.

A preferred construction of enclosure, as shown in somewhat enlarged detail in FIGS. 10 and 11, will be seen to include a plurality of panels 97, 98, 99 and 100, and a mounting frame 101 therefor. The frame 101 is structurally attached, as by bolting, to the surfaces of openings provided in the side walls 62 and includes a sill or base plate 102 and upwardly disposed side members 103 and 104. A bar 105 interconnecting the side members at their upper ends completes each frame. Each side member is provided with an angle 106 having an inwardly directed flange 107. The flange 107 is adapted to receive the associated ends or edges of the panels which combine to effectively seal the wall openings.

The panels 97, 98, 99 and 100 may be of differing or like dimensions and are made up in a laminated arrangement of sheet metal and insulation plies. Such a laminate may comprise an inwardly directed metal surface 108 (FIG. 11) of steel or iron while the outer metal surface 109 may be of a more reflective metal such as aluminum. Between these inner and outwardly disposed surfaces are contained alternate layers 110 of, as for example, asbestos sheets and aluminum foil, that are contained within a panel frame 111 and secured by suitable rivets as indicated at 112.

As illustrated best in FIG. 10, the several panels are formed in varying manners according to their relative positions. In this figure it will be apparent that several of the associated devices, as for example the lip-tiles, are shown in broken line for purposes of clarity. Thus, the lower panel 97 is formed to provide entry slots 113 for receiving the outwardly extending pipes for the sheet coolers 94 and an enlarged, centrally disposed aperture 114 through which the driving shafts for the knurls 95 are inserted. These openings 113 and 114 can be, and preferably are, sealingly closed by means of blocks 115 of a laminated construction, FIG. 11, similar to the panels themselves. Additionally, the panel 97 is equipped with a viewing window 116.

The next panel 98 is provided with a viewing window 117, the glass 118 thereof being supported in an inclined plane to enable easy observation of the sheet meniscus and/or operation of the knurl rolls at an elevation slightly above the "sight" obtained through window 116. Panel 99, disposed next above as shown, is provided along its upper edge with a semi-circular notch 119. This notch co-acts with a like notch 120 in the lower edge of top panel 100 to form a suitable opening through which the bending roll passes. Panels 99 and 100 are both additionally provided with viewing windows 121 and 122, respectively, whereby a continuous observation of the forming sheet can be obtained from the "foot" or meniscus to that portion of the sheet passing around the roll 26.

The several panels are mounted in the frame 101 in relatively fixed positions by means of screw actuated clamps, generally designated 123. Each clamp has a body portion provided with a slot 124 in which the outwardly directed edges 125 of the side frame members 103 and 104 will be received. In order to mount the clamps on these side members, the edges thereof are provided with bayonet slots 126 (FIG. 13) which are adapted to receive a locking pin 127 secured in the clamp body and medially passing through the slot 124 formed therein. By inward and downwardly directed movements of the pin 127 relative to the slot 126, the edge 125 will be received within the slot 124 and the clamp bodily mounted on the frame 103 or 104.

The clamp is likewise provided with an internally threaded lug 128 in which is rotatably carried a threaded clamping member 129. This member is provided with a handle 130 at one or its outer end and with a freely rotatable, annular plate 131 at its opposite end. Preferably, each panel is engaged by at least two clamping members 129 along the vertically disposed ends thereof. Accordingly, when the clamps are turned inwardly, the annular plates 131 of each will bear against the outer surface of the associated panel to urge the same firmly against the leg or flange 107 of the angle attached to the mounting frame. To effectively form a seal therebetween, the marginal edges of each panel are equipped with a folded strip of heat-resistant material 132 (FIG. 12) which operates to compressingly close the spaces or areas otherwise occurring between the metal surfaces of the frame and the respective panels. Of course, upon outward movement of the threaded members 129, the plates 131 will be removed from an associated panel and after which the clamps can be bodily removed by withdrawal of the pins 127 from the bayonet slots 126. This will afford a relatively easy means for gaining access to the drawing chamber and likewise will insure that the areas of the openings in the side walls 62 will be sealed in a substantially complete manner during normal operations of the furnace.

Consequently, the surfaces of the molten glass and of the rising sheet in the drawing area will be protected from the sources of cooler air and the resulting adverse air currents heretofore believed to be necessary evils in production of sheet glass, particularly within the drawing chamber.

This special insulating enclosure which maintains the atmosphere of the forming area at optimum working conditions of temperature and quiescence can be further improved by the provision of a special radiating roof or ceiling in the area above the bending roll where an additional dissipation of heat may be found desirable. For this purpose, the roof 63 is formed by a series of interlocking panels or unitary plates 133 of a thickness and metallic composition that will provide a preferential degree of heat radiation. The capacity of the plate 133 to transfer heat can be readily controlled by the addition or removal of insulation provided, if desired, on the upwardly, exposed surface thereof. By affording a more positive control of heat loss in particularly the drawing chamber, the extraction of heat from the vicinity of the bending roll operates to reduce the normally heated condition and thereby aids the coolants usually introduced into the hollow body thereof. This acts to reduce the occurrence of sheen on the ribbon surface which otherwise might develop as the glass ribbon passes over the roll and is deflected into the horizontal plane of its continued movement.

While herein shown as equipped with a stack or plurality of stacks 134 equally spaced transversely of the chamber, it has been found that under certain circumstances of operation, the same can be dispensed with or the valves therein retained in closed position. However, the stacks 134 can also be used to advantage when it becomes desirable to ascertain the temperature of the glass ribbon as it is moving over the bending roll because they permit suitable inspection or temperature recording devices to be mounted in or inserted therethrough.

To isolate the newly-formed surfaces of the sheet as it passes over the bending roll 26 from air currents originating in the flattening chamber and the lehr, a partition 135 supported on the upper surface of the rear lip-tile 60 and having a vertically disposed wall 136 situated in close relation to the intermediate roll 27 can be employed. A stack 137 (FIG. 14) in the roof 138 of the flattening chamber and lehr also assists in controlling air movement.

In reviewing the several features of this invention, it will be seen that the improved form of sealing bar and the manner of its substantially closed surface relation to the walls of the furnace refining chamber will more effectively reduce, if not completely eliminate, the objectionable entry of prevalent air currents into the cooling chamber. This has been found to effectively correct one of the important sources of temperature variation in the molten glass as it is conditioned before entering the working receptacle or draw-pot. The sealing of the roof arch of the cooling chamber has been found to more positively maintain a stabilized air condition above the molten glass with a resultant improvement in the turbulency of air heretofore encountered and to greatly minimize laterally varying hot and cooler areas in the molten glass surface.

The employment of a tubular dam near the entrance of the cooling chamber has improved the quality of the drawn glass sheet since the small particles of refractory materials previously found to cause lines and seeds are interrupted in their movement into the molten glass. Moreover, this tubular member does not accumulate these particles for subsequent removal, but instead acts to subject them to the reducing influence of the moving glass until they further disintegrate and finally re-enter the molten mass as an imperceptible portion thereof.

Accordingly, a molten glass of better characteristics progressively enters the working receptacle and moves toward the meniscus of the upwardly drawn sheet. Now final efforts to procurring a sheet of good optical quality must be exerted on the molten glass or on the sheet as it approaches the bending roll. These efforts are largely confined to the equalizing of the glass temperature across the molten pool; the obtention of a temperature at which the speed of drawing will produce a sheet of given thickness and the maintenance of a suitably static condition of the air above the draw-pot and within the drawing chamber. By the provision of a muffle-type of front lip-tile, the thermal influencing of the glass can be carried out in a preferential manner of operation and with the possibility that the central area of the pool can be as beneficially reduced in temperature as the edge portions can be raised. This accomplishes not only an improved accuracy of heat application in desired areas but produces this without the entry of the waste products of burned gases of air into the air actually above the glass. These waste products due to variances in temperature and area of entry in the drawing zone have heretofore been responsible for setting up turbulent air currents at the meniscus of the sheet and across the upwardly moving surfaces thereof. More particularly, these turbulent air currents have risen in the vicinity of the surfaces of the sheet and in encountering further air currents in the drawing chamber have reacted to increase the turbulency therein. Also, by the further improvement in the manner of enclosing the drawing chamber, the further sources for the entry of cooler air, the creation of objectionable rising and descending currents has been greatly reduced. With the elimination of exposed sources of heating and cooling from above the surface of the molten glass as it enters the draw-pot together with the more stable condition of the air within the actual area of the drawing chamber, the drawing of a glass sheet of notably improved quality has been achieved.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:
1. A method of sealing a joint in a glass furnace structure comprising, packing a heat-resistant fibrous material along said joint, melting a body of glass onto and across the packed fibrous material, and then cooling said melted glass to substantially solidify the same into a sealing layer.

2. A method of sealing a joint in a glass furnace subjected to high temperatures comprising, packing a fibrous, high heat resistant material into the joint, and melting onto the fibrous material a layer of meltable glass composition.

3. A method of sealing a joint in a glass furnace as claimed in claim 2, including the step of cooling the melting glass composition while subjecting said joint to high temperature to substantially solidify said melted glass layer.

4. A seal for joints in a glass furnace subjected to high temperatures comprising, a fibrous, high heat resistant material positioned within the joint, a layer of meltable glass composition over the fibrous material, and means for cooling said meltable glass composition to substantially solidify the same while said joint is being subjected to said high temperature.

5. A seal for joints in a glass furnace subjected to high temperatures as claimed in claim 4, wherein said cooling means includes a coolant pipe adjacent the seal, and means for circulating a heat absorbing medium through said coolant pipe to remove heat from the meltable glass composition.

References Cited

UNITED STATES PATENTS

| | | | |
|---|---|---|---|
| 1,754,912 | 4/1930 | Slick | 65—347 |
| 1,838,530 | 12/1931 | Coleman | 65—347 |
| 2,693,668 | 11/1954 | Slayter | 65—36 X |
| 2,952,231 | 9/1960 | Chyle et al. | 65—36 X |
| 2,968,083 | 1/1961 | Lentz et al. | 65—27 X |
| 3,155,567 | 11/1964 | Harr | 161—170 |
| 3,157,562 | 11/1964 | Kine et al. | 161—170 |
| 3,278,282 | 10/1966 | Jaray | 65—1 |

DONALL H. SYLVESTER, *Primary Examiner.*

S. LEON BASHORE, *Examiner.*

D. CRUPAIN, G. R. MYERS, *Assistant Examiners.*